United States Patent [19]
Itoh et al.

[11] Patent Number: 6,021,888
[45] Date of Patent: Feb. 8, 2000

[54] CONVEYER SYSTEM AND ITS CONTROL METHOD

[75] Inventors: Kazuo Itoh; Kenji Miki, both of Hyogo, Japan

[73] Assignee: Itoh Electric Company Limited, Hyogo, Japan

[21] Appl. No.: 09/050,785

[22] Filed: Mar. 30, 1998

[30] Foreign Application Priority Data

Mar. 31, 1997 [JP] Japan .................................. 9-098018

[51] Int. Cl.[7] .................................................. B65G 13/06
[52] U.S. Cl. ............... 198/783; 198/781.05; 198/781.06; 198/572; 198/575
[58] Field of Search .............................. 198/783, 781.06, 198/781.05, 780, 572, 575, 576

[56] References Cited

U.S. PATENT DOCUMENTS

| | | | |
|---|---|---|---|
| 5,060,785 | 10/1991 | Garrity ..................................... | 198/783 |
| 5,186,308 | 2/1993 | Munro ..................................... | 198/572 |
| 5,228,558 | 7/1993 | Hall ......................................... | 198/784 |
| 5,285,887 | 2/1994 | Hall ......................................... | 198/781.06 |
| 5,318,167 | 6/1994 | Bronson et al. ....................... | 198/781.06 |
| 5,582,286 | 12/1996 | Kalm et al. ........................... | 198/781.06 |
| 5,730,274 | 3/1998 | Loomer ................................. | 198/781.06 |
| 5,862,907 | 1/1999 | Taylor .................................... | 198/783 |

FOREIGN PATENT DOCUMENTS 3827903  2/1990  Germany .............................. 198/783

*Primary Examiner*—William E. Terrell
*Assistant Examiner*—Khoi H. Tran
*Attorney, Agent, or Firm*—Wood, Phillips, VanSanten, Clark & Mortimer

[57] ABSTRACT

A conveyer system including a plurality of conveyer units connected to each other in series. Each conveyer unit includes a plurality of rollers for conveying articles, a plurality of drive units for causing the rollers to be driven and brought to a halt, a plurality of sensors for detecting the presence or absence of articles on the rollers, and at least one controller for controlling the drive units based on signals from the sensors. Each of the controllers at least receives signals from the sensors of a conveyer unit adjacent to the conveyer unit that accommodates the controller therein.

11 Claims, 3 Drawing Sheets

CONVEYER SYSTEM AND ITS CONTROL METHOD

FIELD OF THE INVENTION

The present invention relates to a method and apparatus for controlling a conveyer system comprising a plurality of conveyer units disposed in series for conveying articles on a plurality of rollers that are driven and halted via drive units. More particularly, the invention relates to a conveyer system capable of controlling rollers by way of individually driving and halting them in correspondence with forms of conveyed articles, while being easily extended or contracted or changed.

BACKGROUND OF THE INVENTION

As shown in FIG. 2, a conventional, prior art, conveyer unit includes a plurality of rollers 101, 102 for conveying articles between a pair of side rails 100, 100 disposed in parallel. The rollers include a plurality of freely rotatable idle rollers 101 and drive rollers 102 to cause articles to be compulsorily conveyed. Each drive roller 102 is rotatable via direct connection with a motor incorporated therein (hereinafter called motor-incorporated roller) or via linkage with an external drive unit such as a motor. A sensor 103 secured to a side rail 100 detects whether articles are actually being conveyed on rollers 101 and 102. If the sensor 103 detects that preceding articles remain in a halt, the drive rollers 102 come to a halt to discontinue conveying of the following articles so that the articles can be prevented from colliding with each other. Accordingly, in normal cases, the conventional conveyer unit causes drive rollers 102 to remain in operating condition even when no article is conveyed, thus resulting in the waste of energy and rapid abrasion of mechanical parts.

Further, in the case of so-called concentrative control systems which use a single controller to control a conveyer system comprising a plurality of conveyer units disposed in series, a large number of cables are required. This requires much time and labor costs for installation, thereby making it quite difficult to extend or contract or change lines of the conveyer system whenever adding or removing or changing conveyer units.

To deal with this disadvantage, a conveyer system designed for effectively activating and halting operation of the drive rollers, and a control system for controlling said conveyer system, has been disclosed in the U.S. Pat. No. 5,285,887. In this conveyer system, interspace between a pair of side rails disposed in parallel is divided into a plurality of zones in the direction of conveying articles. Each zone is provided with drive rollers independently driven in the forward direction and in the reverse direction, a sensor for detecting presence or absence of conveyed articles, and a controller for activating the drive rollers when articles are detected by the sensor. This is a so-called dispersive control system.

In the above dispersive control system, the drive rollers usually remain in a halt. A drive roller in the system is activated, for example, when the sensor in the zone with which the drive roller is provided detects any article and the sensor in the adjacent downstream-side zone detects no article. Accordingly, the control system provided for the above conveyer system can be activated with efficiency of energy.

Further, the Laid-Open Japanese Patent Publication No. HEI-7-172549 has disclosed a conveyer unit via a dispersive control system which facilitates easy change of layout, removal, and reassembly of a conveyer system. The above conveyer unit incorporates rollers for conveying articles, a driver for driving said rollers in the forward and reverse directions, a controller for controlling said driver, and two sensors for detecting presence or absence of articles on the rollers. The controller incorporates a CPU (control means) for executing a plurality of convey-control programs by way of selecting any of memories and the convey-control programs. It is possible to select a proper convey-control program by way of setting parameters. Accordingly, even when the conveyer unit is installed at the downstream end, or at an intermediate portion, the layout can easily be changed since a proper operation can be executed merely by changing parameters.

Further, the Laid-Open Japanese Patent Publication No. HEI-7-206132 has disclosed such a conveyer capable of computing the dimension along the conveying direction of a conveyed article according to the sensor-ON time and the conveying speed of the conveying means. The system uses the gained dimensional data and the conveying speed to sequentially drive respective conveying means (rollers) located at article-conveying positions.

The above-referred conveyer disclosed in U.S. Pat. No. 5,285,887 is divided into a plurality of zones to effect driving and halt of the conveyer per zone. Accordingly, this provides an advantage whenever conveying an article that properly fits the size of the zone, whereas it provides a disadvantage whenever conveying an article being significantly greater than the size of the zone. As shown in FIG. 3, for example, assume that the conveyer is split into zones a through f, if a conveyed article 2 having a dimension extending itself from zones a through e is placed on the conveyer, it generates difficulty to properly convey the article 2. Concretely, zone e can be driven because no article is present in the downstream-side zone f, whereas the other zones a, b, c, and d, respectively, hold on the halted condition because the sensors at the downstream-side zones have detected the presence of an article. Because of this, when a conveyed article extending itself across a plurality of zones is placed on the conveyer disclosed in U.S. Pat. No. 5,285,887, only the foremost zone is driven, whereas the remaining zones cannot be driven. Accordingly, when operating the conveyer disclosed in U.S. Pat. No. 5,285,887, it is difficult to convey a sizable article thereon. Because of this disadvantage, whenever changing size of articles, it is necessary to replace the conveyer itself.

Further, there has been a problem in this conveyer because the conveyer could not properly accommodate itself to convey articles having a variety of sizes in mixture.

Additionally, when operating the above conveyer disclosed in U.S. Pat. No. 5,285,887, discontent is generated because of slow conveying speed even when conveying an article that properly fits the size of the above zones. As shown in FIG. 4, for example, assume that articles 3 are individually placed on the above-referred zones a through e. In this case, the foremost zone e must initially be driven to cause the foremost article 3 to be shifted to leave zone e so that the second article 3 in zone d can be shifted to zone e. After causing the foremost article 3 to leave the following zone f, said zone e carrying the second article 3 is driven. Thus, whenever operating the conveyer disclosed in U.S. Pat. No. 5,285,887, overall conveying speed is quite slow because articles are conveyed via an individual zone with each zone being frequently and repeatedly driven and brought to a halt. Further, when operating the above conveyer disclosed in U.S. Pat. No. 5,285,887, each conveyed article 3 is gradually separated in the course of conveying operation, thereby causing increased time and labor costs associated with the reception work at the conveying destination.

Likewise, the conveyer unit disclosed in the Laid-Open Japanese Patent Publication No. HEI-7-172549cannot control individual rollers that make up a conveyer unit, thereby resulting in difficulty in driving and halting the rollers in correspondence with a variety of forms of articles.

On the other hand, the conveyer disclosed in the Laid-Open Japanese Patent Publication No. HEI-7-206132 computes the dimensions of articles along the conveying direction based sensor-ON time and conveying speed of conveying means. Nevertheless, since the conveying speed used for the above computation is estimated from rotating speed of rollers, error could be generated between the estimated speed and the actual conveying speed to cause error to be generated in the computed dimension of articles. Because of this, discrepancy could occur between those conveying means (i.e., rollers present at positions for conveying articles and those conveying means (rollers) actually being driven.

SUMMARY OF THE INVENTION

Accordingly, it is an object of the invention to provide a conveyer system capable of easily extending or contracting or changing lines thereof in a short time and a method for controlling said conveyer system.

It is another object of the invention to provide a conveyer system capable of individually driving and halting rollers in correspondence with actual dimensions of articles along conveying direction thereof and a method for controlling said conveyer system.

It is a further object of the invention to provide a conveyer system capable of conveying and halting articles at an optional position by way of enabling execution of fine control thereof and a method for controlling said conveyer system.

To achieve the above objects, the conveyer system according to the invention comprises a plurality of conveyer units linked with each other in series. Each conveyer unit comprises a plurality of rollers for conveying articles, a plurality of drive units for driving and halting said rollers, a plurality of sensors for detecting and signaling the presence or absence of articles on said roller means, and at least one controller for controlling said drive units based on the signals from said sensors, the controller receiving signals from the sensors of the conveyer units adjacent to the conveyer unit that accommodates said controller therein.

In the above-referred conveyer system, each controller takes charge of a plurality of drive units and controls them. Further, said controllers individually transmit and receive signals between them.

According to the above-referred conveyer system, even though a conveyed article is shorter and smaller than a single conveyer unit, since the controller for each conveyer unit causes rollers to be driven and halted on the individual basis by way of individually controlling drive units, articles can be conveyed and brought to a halt inside of the conveyer unit. Conversely, even when a conveyed article is large enough to extend itself across a plurality of conveyer units, signals from sensors provided for upstream-side conveyer units are received by controllers of downstreamside conveyer units, and thus, each of the controllers controls drive units in correspondence with forms of articles to cause individual rollers to be driven and brought to a halt.

In an aspect of the invention, the above-referred drive unit and the above-referred roller are conjunctionally integrated to form a "motor-incorporated roller."

In an aspect of the invention, the above-referred sensors are respectively of non-contact form.

In an aspect of the invention, the above-referred sensors are respectively of optical form.

In an aspect of the invention, the above-referred sensors are respectively of mirror-reflective form.

In an aspect of the invention, the above-referred sensors are respectively composed of a combined unit of a light projector and a light receiver.

In an aspect of the invention, the above-referred sensors are respectively disposed in correspondence with individual drive units, wherein whenever sensors corresponding to adjoining drive units simultaneously detect articles, the adjoining drive units integrally activate drive operation and integrally come to a halt.

In another aspect of the invention, according to a method for controlling a conveyer system comprising a plurality of conveyer units being linked with each other in series, each of said conveyer units having at least one controller and a plurality of rollers for conveying articles which are respectively driven and brought to a halt by means of drive units, wherein presence or absence of articles on said rollers is detected by means of sensors, wherein signals from said sensors are input to controllers in the same conveyor units that accommodate said sensors therein and the signals are further input at least to controllers in the conveyer units adjacent to the conveyor units that accommodate said sensors therein, wherein said drive units are respectively controlled by said controllers, thereby making it possible to discretely control each drive unit in correspondence with forms of articles.

According to the above-referred method for controlling the conveyer system, data from sensors of an upstream-side conveyer unit are respectively input to controllers of downstream-side conveyer units so that each controller discretely controls each drive unit to cause each roller to be driven and brought to a halt.

DETAILED DESCRIPTION OF THE PREFERRED EMBODIMENTS

Figure 1:
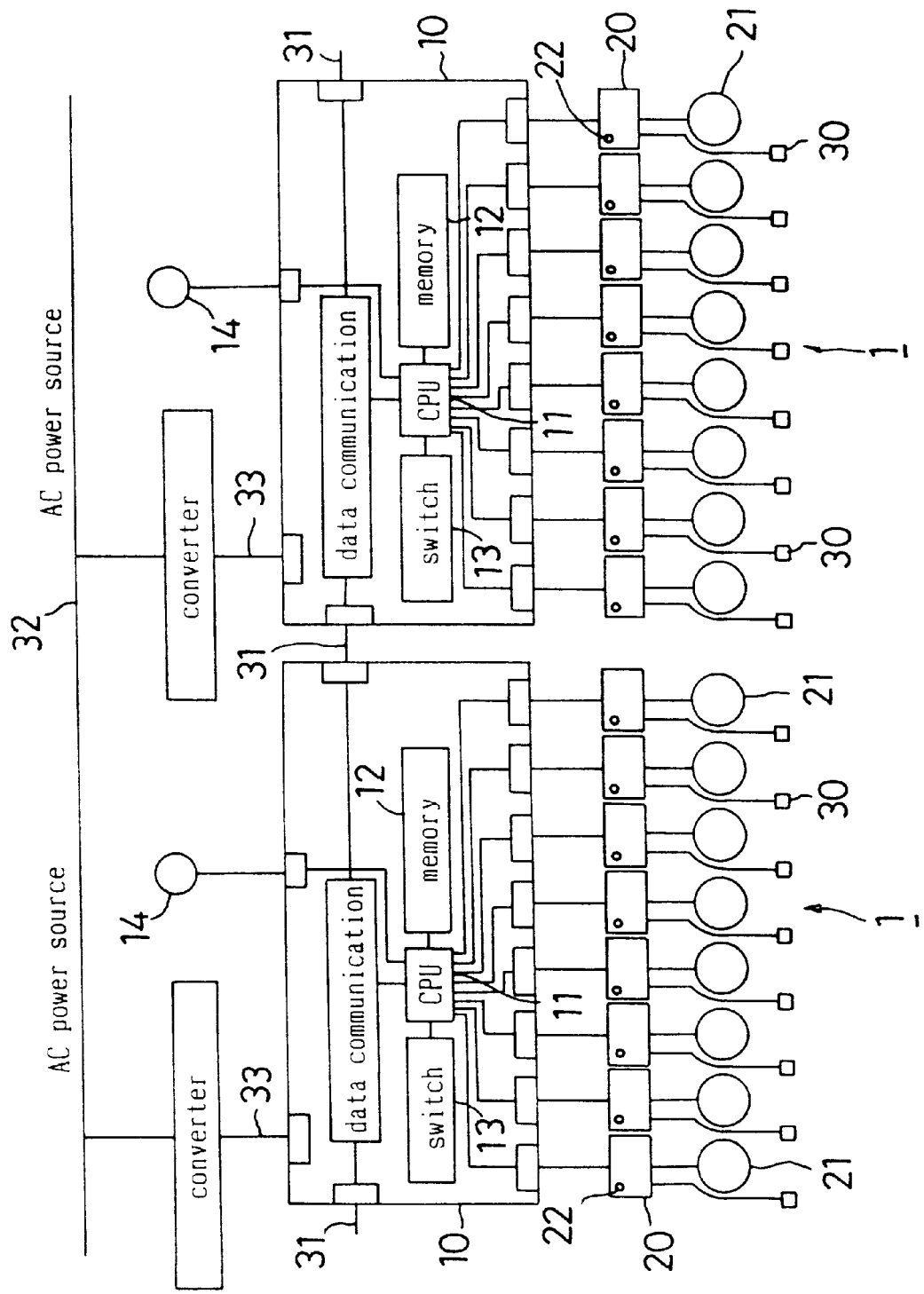
FIG. 1 is a schematic diagram of a conveyer system according to the invention.
Figure 2:
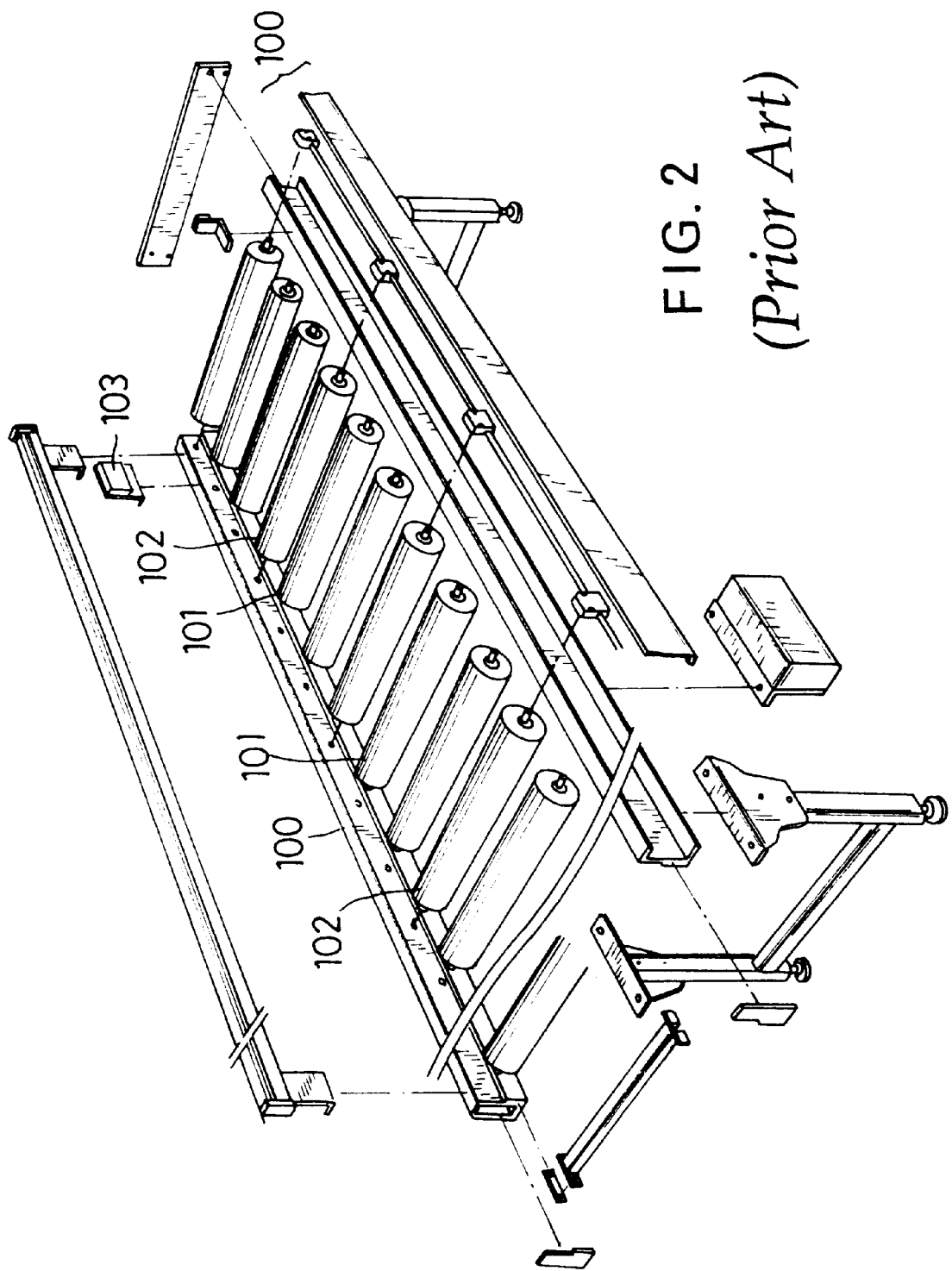
FIG. 2 is an exploded perspective view of a conventional prior art conveyer system.

Referring now to FIG. 1, a preferred embodiment of the invention is described below. FIG. 1 presents a conceptual schematic diagram of a conveyer system according to the invention.

As is shown in FIG. 1, the conveyer system according to the invention comprises a plurality of conveyer units 1 being disposed in series. Each conveyer unit 1 has a controller 10 for controlling operation of a plurality (8 units for example) of drive units 21. Each drive unit 21 comprises a motor for driving and halting rollers for conveying articles. In the case of applying a motor-incorporated roller, each drive motor and each roller are conjunctionally integrated to make up the motor-incorporated roller. The conveyer system according to an embodiment of the invention introduces a plurality of DC-powered motors 21, each being integrated with a roller.

In this embodiment of the invention, a plurality of sensors 30 each corresponding to integrated drive units 21 are provided. In this embodiment, a plurality of drivers 20 are interposed between the controller 10 and each of the integrated drive unit 21 and between the controller 10 and each of the sensors 30. The drivers 20 respectively output DC-current having a predetermined voltage to the integrated drive units 21 in response to signal from the controller 10. Each of the drivers 20 has another function to amplify signals from corresponding sensor 30 and then transmit amplified signals to the controller 10.

Substrate of each driver 20 is secured with a switch 22 for shifting rotational direction of the integrated drive unit 21 clockwise and counterclockwise and also an input connector of the corresponding sensor 30 for detecting articles.

Each of the sensors 30 is disposed in the vicinity of a roller rotatable via the integrated drive unit 21 to respectively detect whether any article is mounted on the roller or not. Since motor-incorporated rollers are used for the embodiment of the invention, each of the sensors 30 is disposed at a position close to the corresponding motor-incorporated roller (integrated drive unit) 21. It is preferred that the sensor 30 be of non-contact form such as an optical sensor, and more specifically, that the sensor 30 be of mirror-reflective form. The sensor 30 may be of a combined unit comprising a light projector and a light receiver.

Lines are connected to each other in order that a signal for the presence or absence of an article on a roller from the corresponding sensor 30 can be transmitted to a CPU (control means) 11 of the controller 10 via the corresponding driver 20. In the conveyer system according to this embodiment of the invention, the CPUs 11 of respective controllers 10 of all the conveyer units 1 are linked with each other via transmission lines 31. Accordingly, any of the controllers 10 receives sensor-data from all other controllers 10.

Accordingly, the CPUs 11 of the controllers 10 of adjoining conveyer units 1 are interlinked via the transmission lines 31 to enable data signals from a plurality of upstream-side sensors 30 to be transmitted to the CPUs 11 of the controllers 10 stored in the downstream-side conveyer units 1. The CPUs 11 are respectively connected with a memory 12 for storing data from the upstream-side sensors 30.

Each of the controllers 10 receives DC power via a DC-power supply line 33 branched from an AC-power supply line 32 attached to the conveyer system. All the CPUs 11, integrated drive units 21, and the sensors 30 are operated via DC-power received by the controllers 10. Each of the CPUs 11 is further connected with an external interface 14 and a switch 13 having function to cancel an overcurrent signal from any driver 20. The error-cancel switch 13 is also used for internally selecting programs. The external interface 14 is fitted with an emergency switch (not shown) for shutting off motor current in any emergency and a recovery switch (not shown).

The controller 10 generates control operation against each of the integrated drive units 21 via respective drivers 20 by way of independently controlling each of the drive units 21 so that they can independently be driven and brought to a halt. Whenever a sensor 30 has actually detected an article and any of the downstream-side sensors 30 has not detected any article, the integrated drive units 21 are driven. Whenever sensors 30 corresponding to adjoining drive units 21 have simultaneously detected any article, the drive units 21 of the adjoining conveyer units 1 are integrally driven and brought to a halt.

Each of the conveyer units 1 is structured as per the above description and a plurality of conveyer units 1 are disposed in series with respective controllers 10 of respective conveyer units 1 being connected to an AC-power supply line 32 and the CPUs 11 of controllers 10 being linked with each other via data transmission lines 31, thus forming up the conveyer system of the invention.

The conveyer system is capable of setting an initiating point and a terminating point at any optional position in any conveyer unit 1. A system is set between the initiating point and the terminating point. Even after extending or contracting or changing the line of the system, it is possible to cause articles to be halted at an optional terminating point of the conveyer system.

Next, operation of the conveyer system of the invention is described below.

For example, in the case of conveying such an article having a small size, only a single sensor 30 corresponding to a single unit of the integrated drive unit 21 detects the article. In this case, unless a sensor 30 corresponding to an integrated drive unit 21 in an adjacent downstream-side of the above-quoted drive unit 21 detects the article, roller of the drive unit 21 mounting the article is rotated to convey the article in the direction of downstream-side. In this way, articles are sequentially conveyed in the direction of downstream-side inside of the conveyer unit 1. More particularly, each sensor 30 inside of a conveyer unit 1 outputs detect signal to the controller 10 of the conveyer unit 1 to cause the controller 10 to control the integrated drive units 21 thereby causing rollers to be driven or halted so that articles can be carried forward or brought to a halt. Since the integrated drive units 21 are discretely driven or brought to a halt by controllers 10, articles can be carried forward without causing collision with other articles.

In this way, articles are delivered to the following conveyer unit 1 so that they can be conveyed further. In this embodiment, inasmuch as the CPU 11 of the controller 10 of the conveyer unit 1 is interlinked with the CPU 11 of the downstreamside controller 10 via the transmission line 31, articles are smoothly delivered to the following conveyer unit.

When dealing with small-size articles, there is such a case in which a plurality of articles are placed on a single conveyer unit 1. Since the present embodiment causes the controller 10 to independently control the integrated drive units 21, in the above-quoted case, for example, among 8 units of the drive units 21, operation is performed by way of driving three drive units from the front and the rearmost unit without activating the remaining four drive units 21.

In the event of conveying medium-size articles, a plurality of adjoining sensors 30 simultaneously detect the same article. Referring to an example shown in FIG. 3, operation is performed by way of the following. Explanation is based on assumption that zones a through f respectively accommodate motor-incorporated rollers each comprising a roller and a drive unit 21 conjunctionally being integrated, where the motor-incorporated rollers in zones a through f are respectively and independently drivable and accommodated with corresponding sensors 30.

Figure 3:
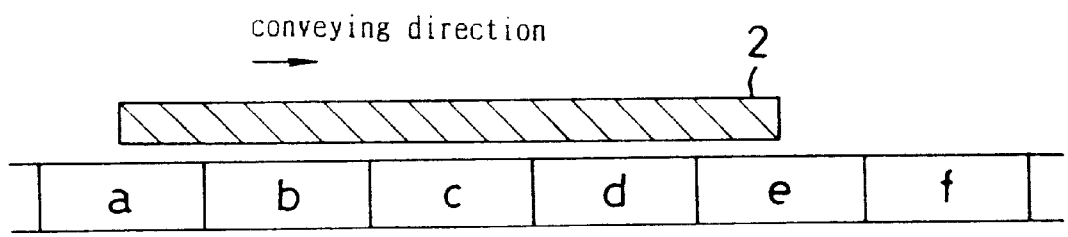
FIG. 3 is explanatory of operations of a conventional conveyer system and the inventive conveyer system.

In the event that such a large article 2 is mounted on zones a through e as shown in FIG. 3, sensors 30 corresponding to the integrated drive units 21 accommodated for zones a through e simultaneously detect the same article 2. In this case, unless the sensor 30 (at zone f) corresponding to the downstream-side integrated drive unit 21 detects the article 2, all the integrated drive units 21 (in zones a through e) corresponding to the article-detected sensors 30 are simultaneously driven. Concretely, when operating the conveyer system according to this embodiment, whenever the sensors 30 corresponding to adjoining drive units 21 have simultaneously detected an article, the integrated drive units 21 of the adjoining conveyer units 1 are conjunctionally driven and brought to a halt thereby causing the adjoining integrated drive units 21 in zones a through e to be driven simultaneously to carry the article in the downstream direction.

When shifting an article from the upstream-side conveyer unit 1 to the downstream-side conveyer unit 1, the article is detected by sensors 30 of the two conveyer units. Further, inasmuch as the CPUs 11 of the controllers 10 of the two conveyer units are interlinked with each other, each CPU 11 can also receive signals from sensors 30 of the other conveyer unit 1 adjoining the one in which said CPU 11 itself is accommodated. Accordingly, articles can be conveyed forward and brought to a halt as required. Even when preceding articles remain in a halt, the following articles are prevented from colliding with the preceding ones.

When conveying a large or lengthy article extending itself across more than two of the conveyer units 1, more than 9 of the sensors 30 jointly detect the article. Data on the article detected by the sensors 30 set in the upstream-side conveyer unit(s) 1 are also received by the CPU 11 of the downstream-side conveyer unit 1 interconnected by the transmission line 31. In his case, those controllers 10 and the CPUs 11 conjunctionally drive and halt the integrated drive units 21 corresponding to the article-mounted portions in response to the received data signal.

Accordingly, articles are carried forward or brought to a halt as required. Even when preceding articles remain in a halt, the following articles are prevented from colliding with the preceding ones.

Further, when operating the conveyer system based on the present embodiment, because the individual drive units 21 are controlled by respective controllers 10, and because the controllers 10 receive and transmit data between them, the conveyer system can smoothly convey articles even when they have a variety of dimensions.

Figure 4:
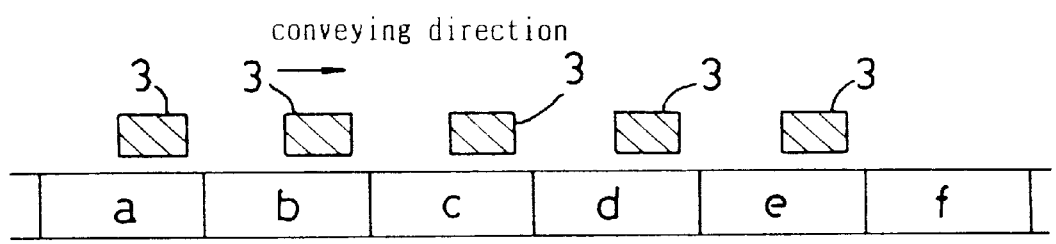
FIG. 4 is explanatory of operations of a conventional conveyer system and the inventive conveyer system.

Further, as show in FIG. 4, when small pieces of article 3 are mounted on respective drive units 21, sensors 30 provided for each drive unit 21 simultaneously detect them to simultaneously activate operation of the drive units 21. Accordingly, all of the mounted articles 3 are conveyed in the downstream direction preserving initial intervals.

According to the invention, though the conveyer system comprises a plurality of conveyer units connected in series, each conveyer unit is provided with a controller capable of receiving signal from sensors of adjacent conveyer units, and thus, based on a so-called dispersive control system, articles can be carried forward in correspondence with their actual dimensions.

Further, since sensors and controllers of adjoining conveyer units are merely connected to each other via a transmission line, even when extending or contracting or changing line of the conveyer system, the work can be done merely by adding or changing the transmission line. In consequence, it is possible to securely contract the time needed for completing extension or contraction or change of the line of the conveyer system.

Since each conveyer unit causes rollers to be driven and brought to a halt individually, articles can securely be conveyed and brought to a halt at any optional position, thus making it possible to perform fine control.

It should be understood that the above-referred embodiments of the invention have been disclosed solely for the intent of exemplifying an extensive technical thought included in the invention.

We claim:

1. A conveyer system comprising:

a plurality of conveyer units separably connected in series, each of said conveyer units comprising a plurality of rollers, a plurality of drive units to drive and halt said roller to convey articles, a plurality of sensors to detect and signal the presence or absence of articles on said rollers, and a controller to control each of said drive units based on the signals from said sensors, each of said controllers operably associated with the controller of an adjacent conveyer unit to receive the signals from the sensors of said adjacent conveyer unit.

2. The conveyer system set forth in claim 1, wherein said drive units and said rollers are integrated to form a plurality of motor-incorporated rollers.

3. The conveyer system set forth in claim 1, wherein said sensors are non-contact sensors.

4. The conveyer system set forth in claim 3, wherein said sensors are optical sensors.

5. The conveyer system set forth in claim 4, wherein said sensors are mirror-reflective sensors.

6. The conveyer system set forth in claim 4, wherein at least one of said sensors comprises a combined unit of a light projector and a light receiver.

7. The conveyer system of claim 1 wherein a plurality of sensors are associated one each with said drive units.

8. The conveyer system of claim 7 wherein adjoining drive units are integrally driven and brought to a halt in response to the sensors of said adjoining drive units simultaneously detecting an article.

9. A method for controlling a conveyer system comprising a plurality of conveyer units separably connected in series, each of the conveyer units including a plurality of drivable rollers to convey articles and a controller to control each of the drivable rollers, the method comprising the steps of:

generating signals indicating the presence or absence of articles on each of the drivable rollers;

for at least one of the conveyer units, inputting the signals generated for the drivable rollers of the at least one conveyer unit and the conveyer units adjacent to the conveyer unit into the at least one controller of the conveyer unit; and selectively driving and halting each of the drivable rollers of the at least one conveyer unit based on said signals input into the controller of the at least one conveyer unit.

10. The method of claim 9 wherein the driving and halting step further comprises the step of integrally driving and bringing to a halt adjoining drive units in response to the sensors of said adjoining drive units simultaneously detecting an article.

11. A conveyer system comprising:

a plurality of conveyer units connected in series and having upstream and downstream ends, each of said conveyer units comprising a plurality of rollers, a plurality of drive units to drive and halt said rollers to convey articles, a plurality of sensors associated one each with said drive units to detect and signal the presence or absence of articles on said rollers, and at least one controller for controlling at least one of said drive units based on the signals from at least one of said sensors associated with another of said drive units that is not immediately upstream or downstream of said at least one drive unit, each of said controllers operably associated with the at least one controller of an adjacent conveyer unit to receive the signals from the sensors of said adjacent conveyer unit.

* * * * *